Patented Aug. 30, 1949

2,480,266

UNITED STATES PATENT OFFICE 2,480,266

MANUFACTURE OF ORGANIC AMINES

Louis Schmerling, Riverside, Ill., assignor to Universal Oil Products Company, Chicago, Ill., a corporation of Delaware No Drawing. Application June 29, 1944,
Serial No. 542,807

10 Claims. (Cl. 260—583)

This invention relates particularly to the manufacture of an organic amine by a series of cooperative and interdependent steps, including reacting a saturated halide with an olefin to form a halogenated saturated hydrocarbon and converting said halogenated hydrocarbon to said organic amine by a method including reacting with a nitrogen-containing compound.

In one aspect the present invention relates to a process for maufacturing an organic amine containing a quaternary carbon atom which is at least one carbon atom removed from the carbon atom attached to the amino group, which comprises reacting a saturated halide with an olefin to produce a halogenated saturated hydrocarbon containing a quaternary carbon atom which is at least one carbon atom removed from the carbon atom attached to the halo group, and converting said halogenated saturated hydrocarbon to said organic amine by a method including reacting with a nitrogen-containing compound.

In another aspect the present invention relates to a process for manufacturing an organic amine, which comprises reacting a saturated halide with a non-tertiary olefin to form a primary or secondary saturated halide, and converting the last mentioned saturated halide to said organic amine by a method including reacting with a nitrogen-containing compound.

In one specific embodiment the present invention relates to the manufacture of 1-amino-3,3-dimethylbutane, which comprises reacting tertiary butyl chloride with ethylene in the presence of a metal halide catalyst of the Friedel-Crafts type to form 1-chloro-3,3-dimethylbutane, reacting the resultant chloro-dimethylbutane with ammonia to form the hydrochloride of 1-amino-3,3-dimethylbutane, and treating the last mentioned compound with an alkaline reagent to form 1-amino-3,3-dimethylbutane.

Another specific embodiment of the present invention relates to the manufacture of 2-amino-4,4-dimethylpentane, which comprises reacting tertiary butyl chloride with propylene in the presence of a metal halide catalyst of the Friedel-Crafts type to form 2-chloro-4,4-dimethylpentane, reacting the resultant chloro-dimethylpentane with ammonia to form the hydrochloride of 2-amino-4,4-dimethylpentane, and treating the last mentioned compound with an alkali to form the corresponding amine.

In still another specific embodiment the present invention relates to the manufacture of 1-amino - 2 - (1'-methylcyclohexyl)-ethane, which comprises reacting 1-chloro-1-methyl-cyclohexane with ethylene in the presence of a metal halide of the Friedel-Crafts type to form 1-chloro-2-(1'-methylcyclohexyl)-ethane, reacting the resultant compound with ammonia to form the hydrochloride of 1-amino-2-(1'-methylcyclohexyl)-ethane, and treating the last mentioned compound with an alkali to form 1-amino-2-(1'-methylcyclohexyl)-ethane.

In still another specific embodiment the present invention relates to the manufacture of 2-amino-2,4,4-trimethylpentane, which comprises reacting tertiary butyl chloride with isobutylene to form 2-chloro-2,4,4-trimethylpentane, reacting the resultant chloro-trimethylpentane with magnesium to form the corresponding Grignard compound, and reacting the Grignard compound with mono-chloroamine to form 2-amino-2,4,4-trimethylpentane.

As used herein, primary, secondary and tertiary amines refer to mono-alkyl, di-alkyl and tri-alkyl amines, respectively. Primary, secondary and tertiary saturated halides refer to saturated compounds in which the halogen atom is attached to a carbon atom adjoining one carbon atom, adjoining two carbon atoms, and adjoining three carbon atoms, respectively. Non-tertiary olefin refers to a primary or secondary olefin and does not include olefins in which the double bond connects a carbon atom which is attached to two other carbon atoms as, for example, in isobutylene.

From the brief description of the invention and the specific embodiments hereinbefore set forth, it is apparent that the present invention proposes a novel method for manufacturing organic amines. The invention is particularly advantageous in the manufacture of an organic amine having a specific structure. Such amines are in many instances of extreme value as, for example, intermediates in the preparation of surface-active agents, pharmaceuticals, etc. and the present invention offers a convenient means for manufacturing these amines.

When it is desired to produce an organic amine containing a specific structure, the saturated halide and olefin to be interreacted are selected so that the final product of the process will comprise the desired amine.

Based on these considerations, any suitable saturated halide, including alkyl halides and naphthenyl halides, may be employed. The preferred alkyl halides comprise tertiary alkyl halides and particularly tertiary butyl chloride, tertiary amyl chloride, etc., and the corresponding bromine compounds. Secondary alkyl halides, preferably the chlorides and the bromides, are also utilizable. The primary chlorides and bromides may be used but it is preferred that these primary halides contain at least three carbon atoms to the molecule.

The naphthenyl halides which may be employed in the present invention include halides in which a halogen is attached to one of the carbon atoms in the naphthene ring as, for example, 1-chloro-1-methylcyclohexane, bromo-cyclohexane, etc., and compounds in which the halogen is attached to an alkyl group which, in turn, is attached to the naphthene ring as, for example, 2-chloro-2-cyclohexyl propane. There may be some question in the art as to whether the compounds last mentioned are considered as naphthenyl halides or alkyl halides but, for purposes of the present invention, they are being considered as naphthenyl halides. In general, tertiary naphthenyl halides are preferred. Although cyclohexane halides are preferred and will generally be employed in the present invention, cyclopentane halides are also utilizable as well as cyclobutane halides, cyclopropane halides and cycloheptane halides and, in some instances, the naphthenyl halide may be poly-cyclic and include such compounds as chloro-decalin, but not necessarily with equivalent results.

The olefin which is to be reacted with the saturated halide will likewise be selected on the basis of the considerations herein set forth. Any suitable olefin, including normally gaseous and normally liquid olefins may be employed. The preferred olefin comprises ethylene, propylene, butylenes, amylenes, and hexylenes, although the higher boiling aliphatic olefins, as well as cyclo-olefins, may be employed but not necessarily with equivalent results.

In the preferred embodiment of the invention the olefin selected comprises a non-tertiary olefin, so that the reaction product of the olefin with a saturated halide will comprise a primary or secondary saturated halide. When ethylene is reacted with a saturated halide a primary halide is preferably formed. When propylene or other non-branched olefin is used, the product will generally comprise a secondary halide. However, when the olefin comprises isobutylene or another tertiary olefin, the product will generally comprise a tertiary halide and this will require the use of a Grignard reagent to convert the tertiary halide to the organic amine, as will hereinafter be set forth in detail.

The saturated halide and olefin may be inter-reacted in the presence of a metal halide catalyst of the Friedel-Crafts type and preferably the chlorides and bromides of aluminum, iron, bismuth, zirconium and zinc. Aluminum chloride is generally preferred as it possesses substantial catalytic activity at relatively low temperatures. The metal halide catalyst of the Friedel-Crafts type may be employed as such, or as mixtures thereof, and may, when desired, be composited with a suitable carrier such as alumina, diatomaceous earth, clay, pumice, activated charcoal, etc. The carrier should have substantially no detrimental effect on the activity of the catalyst. In some instances the catalyst may be dissolved in a suitable solvent, as, for example, a nitroparaffin.

The reaction of the saturated halide and olefin may be effected in the presence of the herein recited catalysts at a temperature of from about −30 to about 125° C. and preferably under sufficient pressure to maintain the reactants substantially in liquid phase. With the more active catalysts, as represented by aluminum chloride, the temperature will usually be within the range of from about −30 to about 50° C. With the less active catalysts, as represented by bismuth chloride, the higher temperatures are employed. The exact temperature to be utilized in any given reaction will also depend upon the particular hydrocarbons being reacted.

In effecting the reaction of the saturated halide and olefin, it may be advisable to commingle with the reaction mixture a small amount of a peroxide, such as benzoyl peroxide, ascaridole, etc., to influence the particular manner in which the saturated halide reacts with the olefin in producing the higher boiling halide having the desired structure. Likewise it may be desirable to commingle hydrogen and/or hydrogen halide with the reacting mixture.

Either batch or continuous operations may be employed to effect the reaction of the saturated halide and olefin. These operations may readily be effected by intimately contacting the reactants with the catalyst at the specified temperature and pressure conditions. After the reaction has been completed to the desired extent, the products are separated from the catalyst, and the products may be further fractionated to separate hydrogen halide, hydrogen, if present, unreacted hydrocarbons and higher boiling reaction products. The hydrogen halide, hydrogen and unreacted hydrocarbons may be recycled, all or in part, within the process for further use therein, while the higher boiling reaction products may, if desired, be further fractionated to separate the saturated halide having the desired chemical structure from other reaction products if the latter products are present to an undesirable extent.

As heretofore set forth, the present invention is directed to the manufacture of an organic amine, and one method of converting a primary or secondary saturated halide, formed in the manner hereinbefore set forth, to an amine comprises reacting the halide with ammonia or another amine. When a primary amine is desired as the final product of the process, the halide is reacted with ammonia at a temperature within the range of about 50° to about 250° C. and preferably of from about 100° to about 200° C. Anhydrous ammonia may be employed and the reaction may be effected either in vapor phase or in liquid phase, or aqueous ammoniacal solutions, alcoholic ammoniacal solutions or alcoholic aqueous ammoniacal solutions may be employed, preferably under sufficient pressure to maintain the reactants substantially in liquid phase, which pressure usually will be within the range of from about 25 to 500 pounds per square inch, or more, depending upon the particular saturated halide and the temperature being employed.

One particularly preferred method of treating the alkyl halide is to employ a 10% excess of ammonia in a solution prepared by adding ammonium hydroxide to an equal volume of 95% ethyl alcohol. It is understood that other alcohols, such as methyl alcohol, propyl alcohol, butyl alcohol, etc., as well as other suitable solvents, may be employed. Usually a catalyst is not required in effecting this reaction, but, when desired, a suitable catalyst, such as zinc chloride, may be employed.

The reaction product of a saturated halide with ammonia will generally comprise the hydro-halide of a primary amine, along with varying proportions of the hydro-halides of the secondary and tertiary amines. These hydro-halides may be separated by fractional crystallization or other methods, and the amine hydrochloride subsequently treated with an alkaline reagent. Preferably, however, the mixture of hydro-halides is treated as hereinafter set forth in the subsequent step of the invention and the desired amine thereafter recovered by fractional distillation or otherwise. In some cases it may be desired to recover the mixture of primary, secondary and tertiary amines as the final product of the process and such subsequent separation procedures may be omitted.

When it is desired to produce principally secondary or tertiary amines, the alkyl halide formed in the manner hereinbefore set forth may be reacted with an organic amine. This step is particularly preferred when it is desired to produce mixed alkyl amines, in which case the hydrocarbon portion of the amine to be reacted with the saturated halide will have a different chemical structure than the hydrocarbon portion of the saturated halide. The reaction of the saturated halide and the amine may be effected within the general conditions of operation as hereinbefore set forth in connection with the reaction of the saturated halide with ammonia.

As hereinbefore set forth, the reaction products of the saturated halide with ammonia will be the hydro-halide and, in accordance with the present invention, the hydro-halide may be heated in the presence of an alkaline reagent, particularly an alkali and more porticularly sodium hydroxide or potassium hydroxide, to form the corresponding amine. The final reaction mixture will generally comprise primary, secondary and tertiary amines, and this mixture may be recovered as such or, when desired, these amines may be separated by fractional distillation or other methods.

The herein recited procedure of reacting the saturated halide with ammonia is particularly applicable to the treatment of primary saturated halides. Secondary saturated halides may similarly be reacted with ammonia, the resulting products often comprising a mixture of the amine hydrochloride and an olefin formed by dehydrohalogenation of the halide. Tertiary saturated halides may be converted to the amine by means of a Grignard reaction. Primary and secondary saturated halides may also be converted to the amine by the Grignard reaction but, as a general rule this method is not preferred because of its high cost. However, if the demand for the particular organic amine is great enough, the use of the more costly process may be justified.

In accordance with this method, the alkyl halide, formed by the reaction of an alkyl halide with an olefin, for example, may be treated with magnesium in the presence of a solvent, usually dry ethyl ether, to form the corresponding magnesium alkyl halide. This reaction is usually effected at atmospheric temperature or below. The temperature must not be too high, as the resulting compound may decompose at higher temperatures. The reaction of magnesium and the alkyl halide may be accelerated by the addition of a suitable catalyst. The resulting magnesium alkyl halide may then be treated with a mono-halo-amine, preferably mono-chloroamine, usually at a temperature of below about 10° C., to form the corresponding organic amine and magnesium halide.

From the description of the invention as heretofore set forth and from the following examples, it will be observed that the present invention is particularly applicable to the manufacture of organic amines containing a quaternary carbon atom which is at least one carbon atom removed from the carbon atom attached to the amino group or, stated in other words, the quaternary carbon atom is separated from the carbon atom attached to the amino group by at least one intervening carbon atom. Examples of these amines are 1-amino-3-3-dimethylbutane, 2-amino-4,4-dimethylpentane, 2-amino-2,4,4-trimethylpentane, 1-amino-2-(1'-methylcyclohexyl)-ethane, etc.

The following examples are introduced to further illustrate the novelty and utility of the present invention but without unduly limiting the broad invention thereof.

*Example I*

50 grams of tertiary butyl chloride, 20 grams of normal pentane diluent and 5 grams of aluminum chloride are placed in a glass vessel equipped with a mechanical stirrer, and ethylene is bubbled through the well-stirred mixture for 20 minutes, the temperature being maintained at −15 to 0° C. About 20 grams of ethylene are absorbed. There is obtained a 75% yield of 1-chloro-3,3-dimethyl-butane boiling at 115–116° C. The 1-chloro-3,3-dimethyl-butane is reacted at a temperature of 180° C. with an alcoholic solution of ammonia, and the reaction products, comprising the hydrochlorides of primary, secondary and tertiary 3,3-dimethylbutylamines, are heated in the presence of sodium hydroxide to form the corresponding amines. 1-amino-3,3-dimethylbutane is separated from the secondary and tertiary amines by fractional installation.

*Example II*

Tertiary butyl chloride and propylene are reacted in the presence of a bismuth chloride catalyst at a temperature of about 25° C. to form 2-chloro-4,4-dimethylpentane. The chloro-dimethylpentane is then reacted with ammonia and the products are heated and reacted with calcium hydroxide to form 2-amino-4,4-dimethylpentane along with the corresponding secondary and tertiary amines, as well heptenes formed as byproducts of the reaction.

*Example III*

1-chloro-1-methylcyclohexane is reacted with ethylene in the presence of an aluminum chloride catalyst at −30° C. to form 1-chloro-2-(1'-methylcyclohexyl)-ethane, which is reacted successively with ammonia and potassium hydroxide in the manner hereinbefore set forth to form 1-amino-2-(1'-methylcyclohexyl)-ethane, along with the corresponding secondary and tertiary amines. The primary amine may be separated from the other products by fractional distillation.

*Example IV*

Tertiary butyl chloride is reacted with isobutylene in the presence of an aluminum chloride catalyst at a temperature of about −15° C. to form 2-chloro-2,4,4-trimethylpentane. A solution of the chloro-trimethylpentane in ether is reacted with magnesium ribbon at a temperature of about 20° C. to form the corresponding organo-magnesium compound, which is reacted with mono-chloroamine at a temperature of about −10° C. to form 2-amino-2,4,4-trimethylpentane.

I claim as my invention:

1. A process for manufacturing a saturated organic amine containing a quaternary carbon atom which is at least one carbon atom removed from the carbon atom attached to the amino group, which comprises reacting a tertiary monohalosaturated hydrocarbon with an aliphatic non-tertiary monoolefinic hydrocarbon in the presence of a Friedel-Crafts metal halide catalyst selected from the group consisting of the chlorides and bromides of aluminum, iron, bismuth, zirconium and zinc to form a higher molecular weight monohalo-saturated hydrocarbon containing a quaternary carbon atom which is at least one carbon atom removed from the carbon atom attached to the halogen, reacting said higher molecular weight monohalo-saturated hydrocarbon with a nitrogen-containing compound selected from the group consisting of ammonia and organic amines and treating the resultant product with an alkali.

2. A process for manufacturing a saturated organic amine containing a quaternary carbon atom which is at least one carbon atom removed from the carbon atom attached to the amino group, which comprises reacting a tertiary monohaloalkane with an aliphatic non-tertiary monoolefinic hydrocarbon in the presence of a Friedel-Crafts metal halide catalyst selected from the group consisting of the chlorides and bromides of aluminum, iron, bismuth, zirconium and zinc to form a higher molecular weight monohaloalkane containing a quaternary carbon atom which is at least one carbon atom removed from the carbon atom attached to the halogen, reacting said higher molecular weight monohaloalkane with a nitrogen-containing compound selected from the group consisting of ammonia and organic amines and treating the resultant product with an alkali.

3. A process for manufacturing a saturated organic amine containing a quaternary carbon atom which is at least one carbon atom removed from the carbon atom attached to the amino group, which comprises reacting a tertiary monohalonaphthene with an aliphatic non-tertiary monoolefinic hydrocarbon in the presence of a Friedel-Crafts metal halide catalyst selected from the group consisting of the chlorides and bromides of aluminum, iron, bismuth, zirconium and zinc to form a higher molecular weight monohalonaphthene containing a quaternary carbon atom which is at least one carbon atom removed from the carbon atom attached to the halogen, reacting said higher molecular weight monohalonaphthene with a nitrogen-containing compound selected from the group consisting of ammonia and organic amines and treating the resultant product with an alkali.

4. The process of claim 1 wherein said tertiary monohalo-saturated hydrocarbon comprises a tertiary monochloro-saturated hydrocarbon.

5. The process of claim 1 further characterized in that said tertiary monohalo-saturated hydrocarbon is reacted with said aliphatic monoolefinic hydrocarbon at a temperature of from about −30° C. to about 125° C. and at a pressure sufficient to maintain the reactants substantially in liquid phase.

6. The process of claim 1 wherein said catalyst comprises aluminum chloride.

7. A process for manufacturing 1-amino-3,3-dimethylbutane, which comprises reacting tertiary butyl chloride with ethylene in the presence of an aluminum chloride catalyst to form 1-chloro-3,3-dimethylbutane, reacting the resultant chloro-dimethylbutane with ammonia to form the hydrochloride of 1-amino-3,3-dimethylbutane, and treating the last mentioned compound with an alkali to form 1-amino-3,3-dimethylbutane.

8. A process for manufacturing 2-amino-4,4-dimethylpentane which comprises reacting tertiary butyl chloride with propylene in the presence of a bismuth chloride catalyst to form 2-chloro-4,4-dimethylpentane, reacting the resultant chloro-dimethylpentane with ammonia to form the hydrochloride of 2-amino-4,4-dimethylpentane, and treating the last mentioned compound with an alkali to form 2-amino-4,4-dimethylpentane.

9. A process for manufacturing 1-amino-2-(1'-methylcyclohexyl)-ethane, which comprises reacting 1-chloro-1-methylcyclohexane with ethylene in the presence of an aluminum chloride catalyst to form 1-chloro-2-(1'-methylcyclohexyl)-ethane, reacting the resultant compound with ammonia to form the hydrochloride of 1-amino-2-(1'-methylcyclohexyl)-ethane, and treating the last mentioned compound with an alkali to form 1-amino-2-(1'-methylcyclohexyl)-ethane.

10. 1-amino-3,3-dimethylbutane.

LOUIS SCHMERLING.

REFERENCES CITED

The following references are of record in the file of this patent:

UNITED STATES PATENTS

| Number | Name | Date |
|---|---|---|
| 2,019,275 | Sharples | Oct. 29, 1935 |
| 2,068,772 | Sixt | Jan. 26, 1937 |
| 2,072,015 | Tamele | Feb. 23, 1937 |
| 2,115,250 | Bruson | Apr. 26, 1938 |
| 2,159,370 | Driesbach | May 23, 1939 |
| 2,172,822 | Tamele | Sept. 12, 1939 |
| 2,253,179 | Hentrich | Aug. 19, 1941 |
| 2,297,564 | Kirkbride | Sept. 29, 1942 |
| 2,353,766 | Schmerling | July 18, 1944 |

OTHER REFERENCES

Simons et al., Jour. Am. Chem. Soc., 65 (1943) pp. 1269–1271.

Adams et al., "Organic Reactions" (John Wiley & Sons, 1946), vol. 3, pages 22–77.

Beilstein, Handbuch der Org. Chemie, vol. IV, 4th ed., pp. 188, 192, 193 and 198.

Beilstein, "Handbuch der Org. Chemie" vol. XII (4th ed.) pages 14, 15 and 16.